United States Patent
Harshberger et al.

(10) Patent No.: US 8,954,243 B2
(45) Date of Patent: Feb. 10, 2015

(54) DYNAMIC TIP-OFF DETECTION, DISPLAY AND LOCATION SELECTION

(71) Applicant: Caterpillar Inc., Peoria, IL (US)

(72) Inventors: Wayne E. Harshberger, Oswego, IL (US); Jeff Buettner, East Peoria, IL (US); Robert Stanley, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 92 days.

(21) Appl. No.: 13/890,340

(22) Filed: May 9, 2013

(65) Prior Publication Data

US 2014/0336874 A1  Nov. 13, 2014

(51) Int. Cl.
*G01G 19/14* (2006.01)
*G01G 19/00* (2006.01)

(52) U.S. Cl.
USPC .................................. 701/50; 701/1; 177/141

(58) Field of Classification Search
CPC ..... G01G 19/08; G01G 19/14; G01G 19/387; G06F 7/00; G06F 19/00; E02F 3/64
USPC ............. 701/50, 1; 177/139, 136, 141, 25.19; 702/174
See application file for complete search history.

(56) References Cited

U.S. PATENT DOCUMENTS

| | | | |
|---|---|---|---|
| 4,230,196 A * | 10/1980 | Snead | 177/141 |
| 4,921,578 A * | 5/1990 | Shiraishi et al. | 177/25.19 |
| 5,182,712 A | 1/1993 | Kyrtsos et al. | |
| 5,220,968 A | 6/1993 | Weber | |
| 5,848,368 A | 12/1998 | Allen et al. | |
| 6,211,471 B1 | 4/2001 | Rocke et al. | |
| 6,858,809 B2 | 2/2005 | Bender | |
| 6,931,772 B2 | 8/2005 | Furuno et al. | |
| 7,627,410 B2 | 12/2009 | Berry et al. | |
| 7,797,860 B2 * | 9/2010 | Schoenmaker et al. | 37/348 |
| 8,271,229 B2 | 9/2012 | Hsu et al. | |

* cited by examiner

*Primary Examiner* — Tan Q Nguyen
(74) *Attorney, Agent, or Firm* — Miller, Matthias & Hull

(57) ABSTRACT

Tip-off is a process of bringing a transport vehicle to a target weight by using only part of a bucket of a loader. By observing sensor data, tip-off may be automatically determined. Once determined, a visual indication may be made to an operator, allowing the operator to both confirm that tip-off mode is active and to show what tip-off mode is selected, truck tip-off or pile tip-off. Among other benefits, automatic tip-off allows an operator to maintain contact with the loader controls when entering tip-off mode of operation.

20 Claims, 7 Drawing Sheets

DYNAMIC TIP-OFF DETECTION, DISPLAY AND LOCATION SELECTION

TECHNICAL FIELD

The present disclosure relates generally to loaders and more particularly to loading a container with a desired payload weight of loose material, and automatically detecting and displaying a tip-off mode of operation.

BACKGROUND

In quarries and other types of payload material collection sites, mobile loaders, such as wheel loaders, backhoe loaders, and track type loaders are used to load loose payload material into haul vehicles, such as over the road trucks. Payload information, including the desired type and amount of payload material for each truck needs to be communicated to the quarry personnel who operate the loaders. For instance, this information might be transmitted from a quarry office based computer to a mobile computer on the loader via wireless communication as described in co-owned U.S. Pat. No. 5,848,368. This information enables the loader operator to proceed to the correct pile corresponding to the requested material.

A typical work cycle can begin with the operator first positioning the bucket of the loader at a pile of the requested material. The bucket is then lowered so that the work implement is near the ground surface. The operator then advances into the pile and controls the bucket to raise the work implement through the pile to fill the bucket and lift the material. The operator then tilts or pitches the bucket back to capture the material. The operator then moves the loader to a desired target location, such as an over the road truck, and dumps the captured material from the bucket. The operator then moves the loader back to the pile to start this work cycle over again. In the case of typical over the road trucks, depending upon their size, a full load will typically require between three and six bucket loads to fill the truck with the desired material up to a target load weight.

Many of today's loaders have payload control systems that allow for accurate measurements of the bucket payload. Thus, with each successive bucket, the loader can sum the load weight of the bucket loads to determine an estimated amount of payload already in the truck. Typically, on a final pass of the truck loading cycle, the loader adds less than a full bucket payload to the truck in a process known as tip-off.

There are two approaches to tip-off. One approach is to load the bucket at the pile and use in-vehicle sensors to determine the load in the bucket and tip-off the excess amount at the pile, leaving in the bucket the amount needed at the road truck. This is known as pile tip-off. Another approach is to rack the bucket and partially empty the bucket into the road truck to reach the target road truck capacity, known as truck tip-off.

Because the loader can keep track of how much material, by weight, has been added to the road truck it is important that the loader know what type of tip-off was used. In pile tip-off, the amount remaining in the bucket will be added to the truck load. In truck tip-off, the amount off-loaded will be added to the truck load. In many cases, the final truck payload determines both the sale price of the payload, but may also be used to calculate incentives for the loader operator.

Co-owned U.S. Pat. No. 6,211,471 describes a process that reweighs material in the bucket after the operator performs a partial dump. However, in practice, operators must first pre-set what type of tip-off is being used (pile vs. truck) and then explicitly indicate that they are about to perform a tip-off. This raises several potential issues. If the type of tip-off is incorrect, the load delivered to the truck will be incorrectly calculated, with a potential financial impact. If the operator forgets to indicate a tip-off, the load also may be incorrectly calculated and may require re-weighing or even reloading. In addition, there is a safety concern because the operator must remove his or her hand from the controls to push the tip-off button each time a tip-off is performed. This continuous attention to tip-off setting and the physical motions associated with may, over a period of time, increase operator fatigue.

SUMMARY

In one aspect, a method of enhancing tip-off operation in a loader, the method includes receiving at least one input from one or more sensors in the loader, using the at least one input, automatically detecting a tip-off and setting a tip-off mode to active. The method may also include setting an operator display to indicate that the tip-off mode is active, and setting an operator display to indicate a tip-off location. After determining that the tip-off is complete the method may continue by setting the tip-off mode to inactive and setting the operator display to indicate that the tip-off mode is inactive.

In another aspect, a system for enabling hands-free tip-off operation in a loader with a bucket can include a display configured to display icons related to truck payload, bucket payload, tip-off location, and tip-off mode, an input that receives operating instructions, a plurality of sensors that report a position of the bucket and a mass of material in the bucket and an electronics control module (ECM). The ECM can include a processor, a memory, and computer-executable modules stored in the memory that are executed on the processor. The modules can include a first module that receives the operating instructions and sets a tip-off location, a second module that receives information from the plurality of sensors and determines a tip-off operation and sets a tip-off mode to active, a third module that causes the display to show that a tip-off mode is active and a current tip-off location, and a fourth module that stores tip-off payload information until an indication that the tip-off mode has ended. This may cause the third module to store the tip-off payload in the current tip-off location and further cause the second module to a change the display to show that tip-mode is inactive.

In yet another aspect, a method of reducing human-computer interaction in a loader during tip-off operation may include without human input, automatically detecting a tip-off operation, displaying an indication of operation in a tip-off mode, displaying an indication of a tip-off location, and storing payload data according to the tip-off mode and tip-off location. The method may also include detecting completion of the tip-off operation and clearing the display of the indication of operation in the tip-off mode.

These and other benefits will become apparent from the specification, the drawings and the claims.

DESCRIPTION

Figure 1:
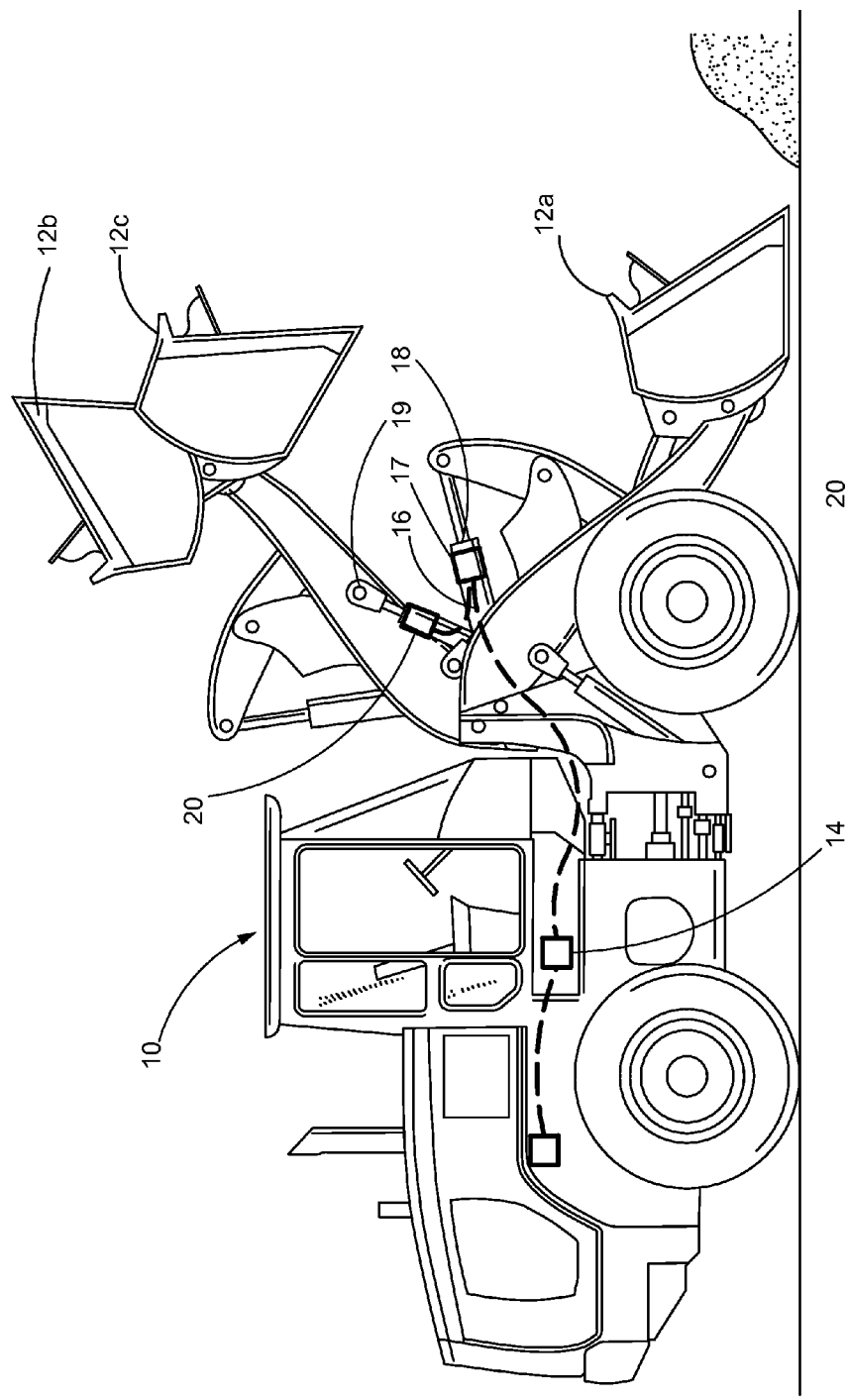
FIG. 1 is a view of a loader.

FIG. 1 illustrates a loader 10 having a bucket 12, a payload controller 14, a communication line 16, a displacement sensor 17 that communicates a position of a bucket tilt cylinder 18, a lift cylinder 19, and a lift cylinder position sensor 20. The bucket 12 is shown in a number of positions. Position 12a illustrates the bucket 12 in position for a dig. Position 12b illustrates the bucket 12 fully racked, or tipped up. Position 12c illustrates the bucket 12 fully dumped.

Figure 2:
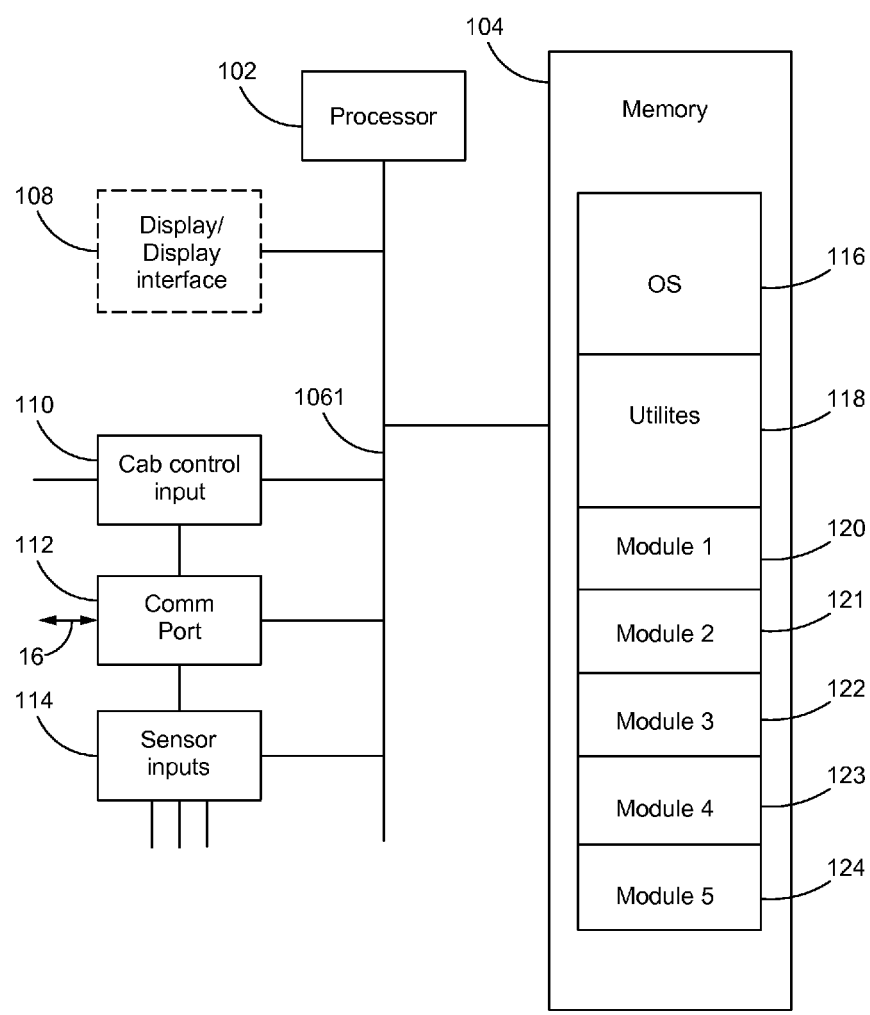
FIG. 2 is a block diagram of an electronics system of the loader.

FIG. 2 is a block diagram of the payload controller 14. The payload controller 14 may be part of or adjunct to another electronics computing module (not depicted) that may include an engine controller, chassis controller, etc. The payload controller 14 may include a processor 102 and a memory 104 that communicate via an internal communication bus 106. The payload controller 14 may include or may provide data to a display 108, discussed in more detail below.

The payload controller 14 may also include a cab control input block 110 that receives input from the cab, such as, but not limited to load information and switch position data, such as a store switch or a clear switch related to bucket payloads. A communication port 112 may send and receive data via the communication line 16. Sensor input block 114 may receive information from a variety of sensors, including displacement sensor 17 and lift cylinder position sensor 20. The cab control input block 110 and the sensor input block 114 may receive information via direct connections with, for example, a sensor or may receive information via the communication line 16 and communication port 112.

The sensor input block 114 may be configured to receive and process information about bucket tilt, lift arm position, various hydraulic pressures such as pressure at the lift cylinder 19 or bucket tilt cylinder 18.

The memory 104 may be any combination of volatile and non-volatile memory, including rotating media, flash memory, conventional RAM, ROM or other non-volatile programmable memory, but does not include carrier waves or other propagated media. The memory 104 may include an operating system 116 and utilities 118, such as diagnostic routines, etc. The memory 104 may also include a number of modules 120, 121, 122, 123, 124 having executable code that may be executed by the processor to cause specific effects and actions to be taken in the payload controller 14 or at the display 108. These exemplary modules 120-124 will be discussed in more detail below.

Figure 3:
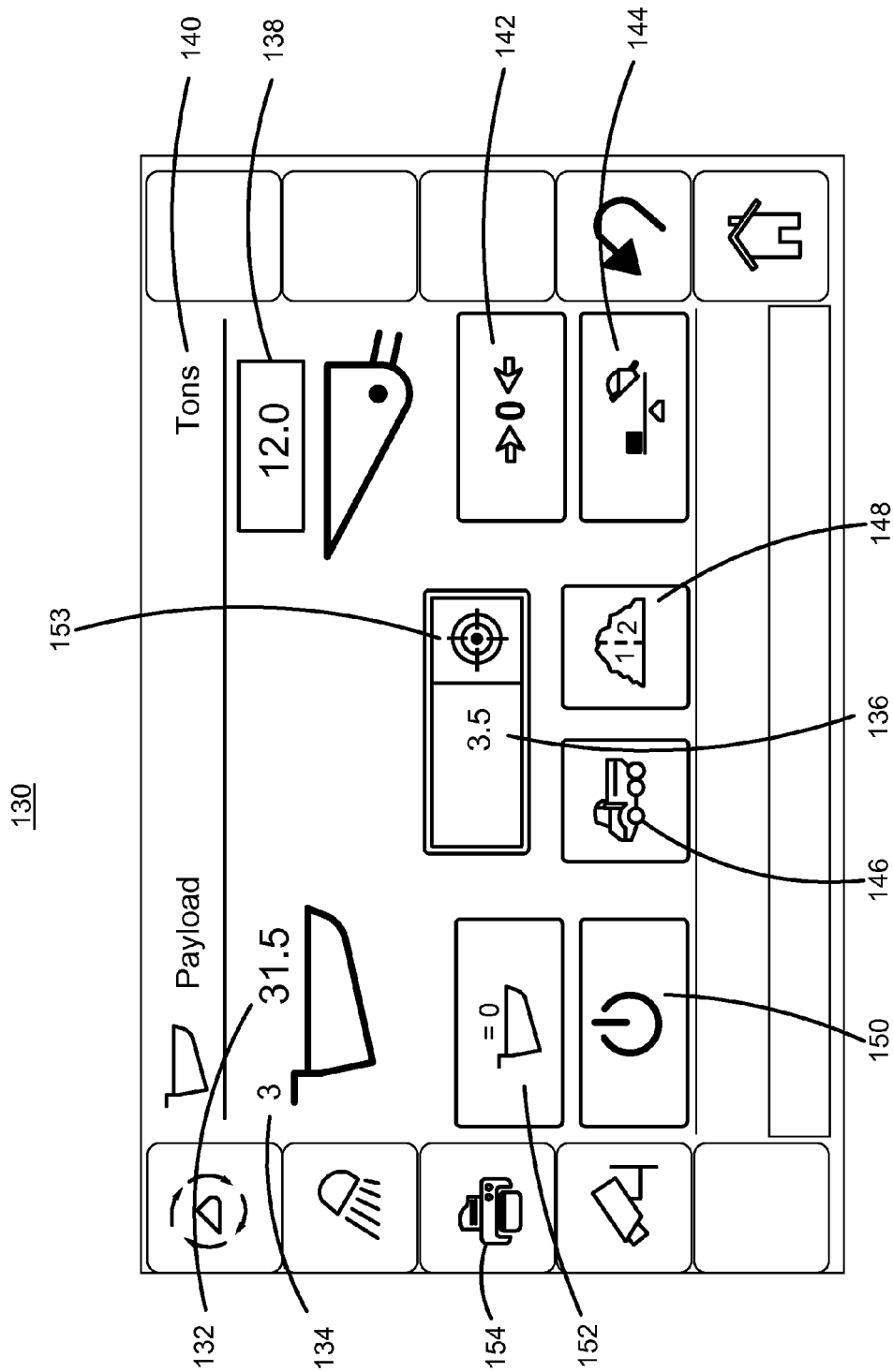
FIG. 3 is a screen shot of a display of the electronics system showing payload operation.

FIG. 3 illustrates a screen shot of the display 108 showing an exemplary payload display screen 130. The payload display screen 130 may include information both about the loader 10 itself and the truck (not depicted) that is being loaded. The embodiment of the payload display screen 130 illustrated has current condition information that may include a current truck payload weight 132 and a number of buckets used 134 to reach the designated weight. The payload display screen 130 may include a remaining weight 136 to be added to the current truck to reach its target weight, the amount of material currently in the bucket 138 and the units of measure 140 (in this case tons).

The payload display screen 130 may also include other operational information or inputs including a zero button 142 that allows zeroing the weight of the bucket, for example, if material is stuck in the bucket, a reweight button 144 that enables a new bucket weight to be calculated, for example, by lowering and lifting the bucket 12. A truck identifier 146 allows a truck being loaded to be identified and a material identifier 148 allows the type of material to be selected from, for example, a previously stored list. Other buttons may include a standby button 150, a clear button 152 that excludes the current truck load from memory, and a print button 154.

Figure 4:
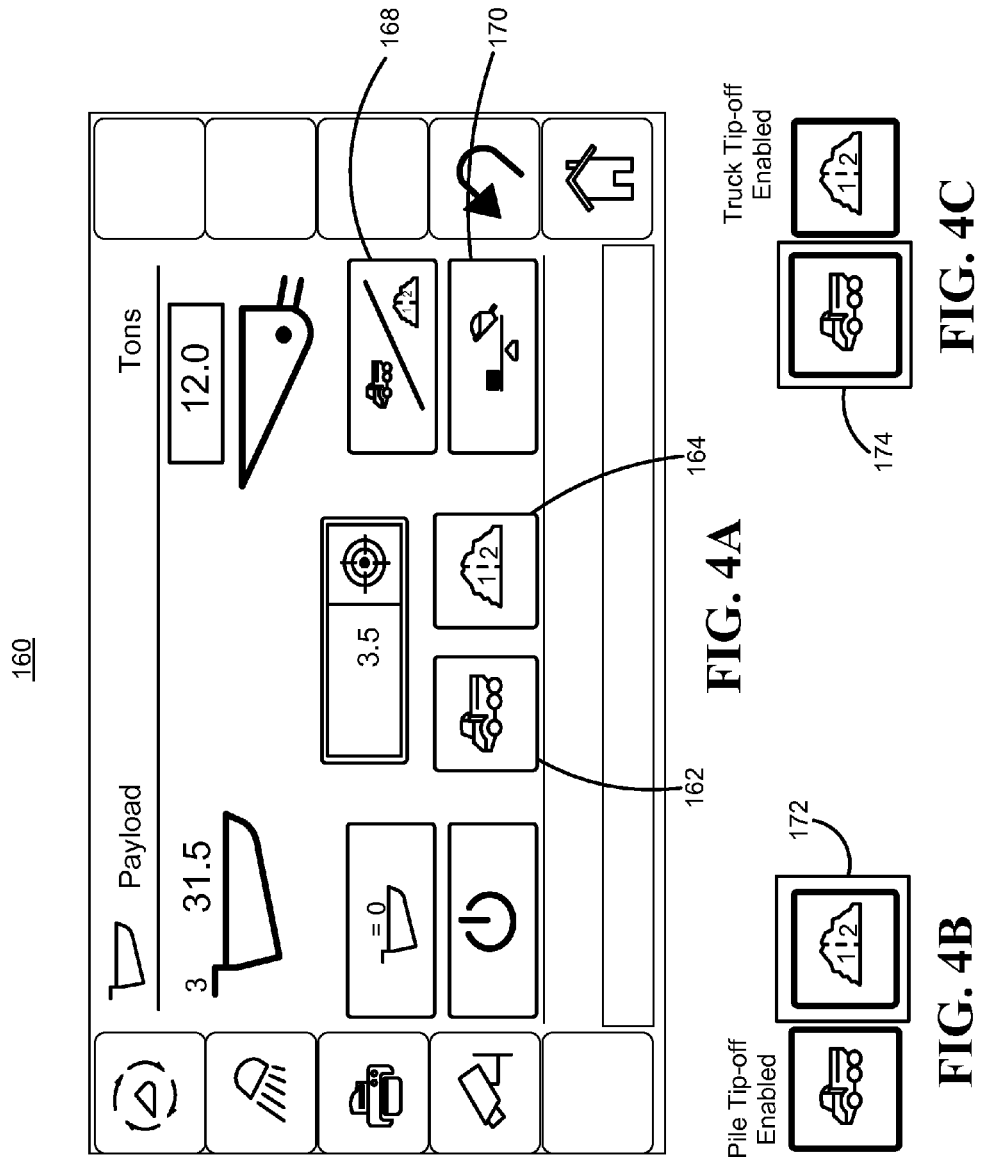
FIG. 4A is a screen shot of the display of the electronics system showing tip-off operation.
FIG. 4B is a screen shot of a portion of the display of the electronics system in one state.
FIG. 4C is a screen shot of a portion of the display of the electronics system in another state.

FIGS. 4A, 4B and 4C illustrate a dynamic tip-off display screen 160 that may include much of the data presented in the payload display screen 130 but that may also include modified or re-purposed icons.

Turning to FIG. 4A, the truck and material identifier buttons of FIG. 3 may be re-purposed to illustrate tip-off mode. For example, the soft button 168 is illustrated as being redefined to allow the tip-off mode to be toggled between pile tip-off and truck tip-off. The soft button 170 may be re-purposed to allow splitting a bucket load across two trucks.

Turning briefly to FIGS. 4B and 4C, the icons 162 and 164 are shown separately for clarity. In FIG. 4B, the highlight 172 illustrates both that the payload controller 14 is operating in tip-off mode and that the mode is set to pile tip-off. FIG. 4C illustrates via a highlight 172 both that the payload controller 14 is operating in tip-off mode and that the mode is set to truck tip-off. That is, the highlight in either position indicates tip-off mode is active and the location of the highlight indicates which tip-off mode is active.

Industrial Applicability

Accurate load weights are used both to maximize the efficiency of a loading operation and also to incentivize loader operators to accurately hit target weights in vehicles. At the same time, operator activity associated with tip-off mode operation can become a both a distraction to an operator and can cause fatigue that can be exhibited in a range of consequences from inaccurate weights being reported to injury and/or damage caused by an operator repeatedly removing his or her hands from the controls in order to manually enter tip-off mode.

Automatically determining tip-off operation and setting the display to show a readily discernible indication of both tip-off operation and tip-off mode benefits both a loading operation and a loading operator. Further, the ability to change tip-off mode at any time during the tip-off means that fewer loads need to be emptied or re-weighed. In addition, work site safety may be improved because operators experience less distraction using automatic tip-off detection compared to manually entering tip-off mode each time it is required.

Figure 5:
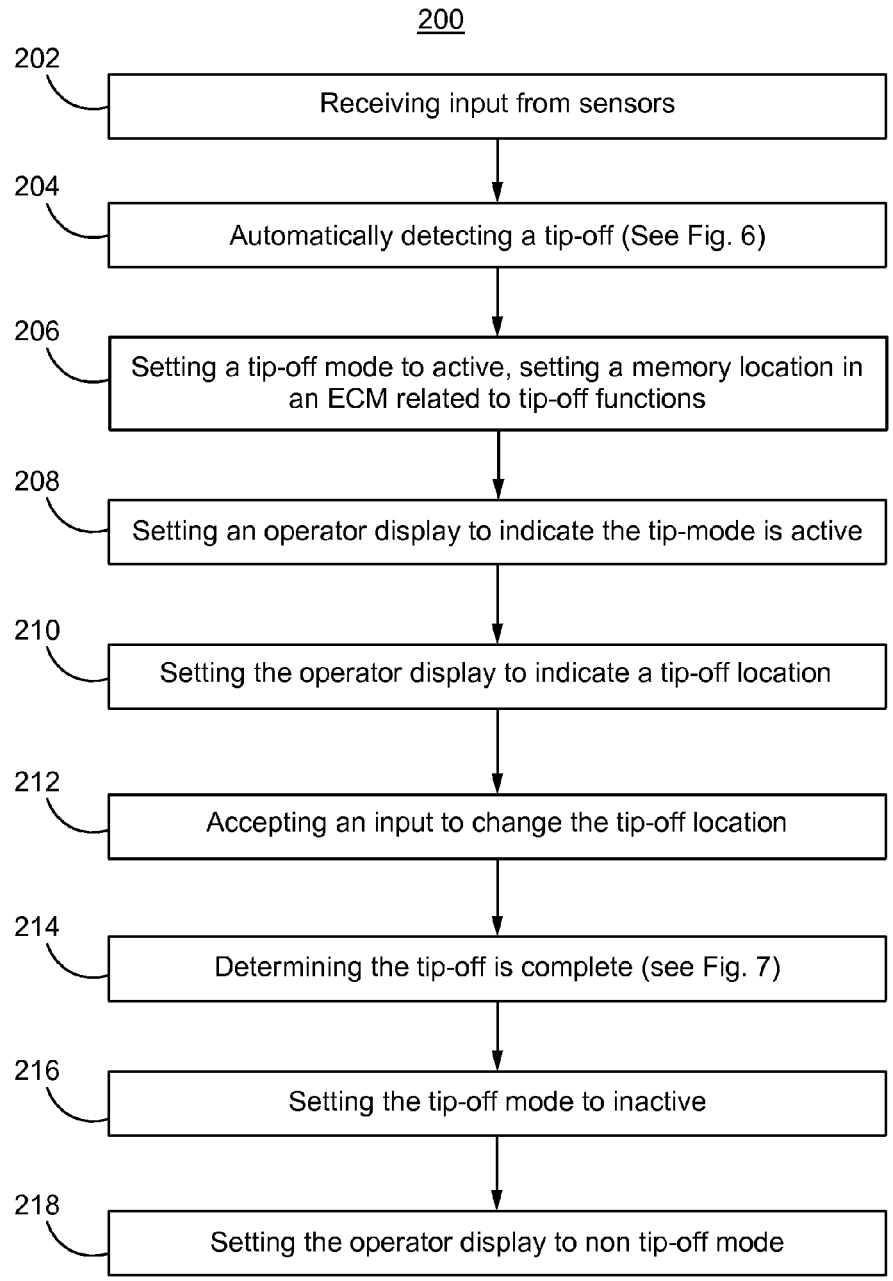
FIG. 5 is a flowchart of a method of dynamic tip-off detection, display, and location selection.

FIG. 5 is a flow chart of a method 200 of dynamic tip-off detection, display, and location selection. At a block 202, input from one or more sensors in the loader 10 may be received at a payload controller 14 or other electronic control module (ECM).

At block 204, using the at least one input, automatically detecting a tip-off. The process of automatically detecting a tip-off is discussed in more detail below with respect to FIG. 6.

At block 206, a tip-off mode may be set to active, for example, by setting a memory location in the payload controller 14 or other ECM. In an embodiment, setting the memory location causes certain modules stored in the payload controller 14 or other ECM to be used for determining tip-off mode or location, storing partial bucket weights, and monitoring sensors for indications that tip-off mode has ended.

At block 208, an operator display may be set to indicate that the tip-off mode is active. This may include, as shown in FIG. 4B and 4C, highlighting an icon on a display in the loader that also indicates what tip-off mode is currently selected at block 210. Other indications of tip-off location may be used, such as a text indicator (not depicted).

At block 212, an input to change the tip-off location may be received. Of course, if the current tip-off location is accurate, there would be no reason for an operator to change the selection of tip-off location. As discussed above, the selection of tip-off location affects the nature of the bucket payload data that is stored. At its simplest, a pile tip-off retains the weight of material stored after a partial dump and a truck tip-off retains the weight of material removed by a partial dump.

At block 214, determining that the tip-off is complete may be accomplished by any one of several mechanisms. See FIG. 7 and the discussion below for more details.

At block 216, after determining that the tip-off is complete, the tip-off mode may be set to inactive and at block 218, the display may be reverted to non-tip-off mode functionality (see, e.g., FIG. 3).

Figure 6:
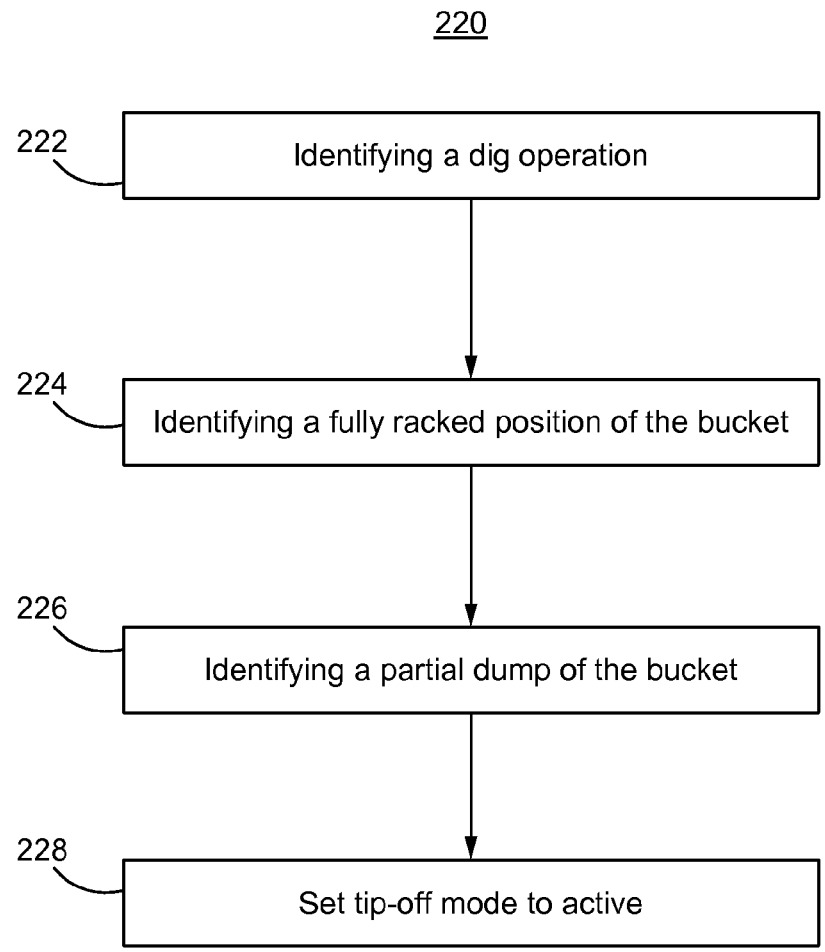
FIG. 6 is a flowchart illustrating tip-off mode detection.

FIG. 6 is a flowchart of a method 220 of automatically detecting a tip-off mode of operation in a loader 10 and may be used at block 204 of FIG. 5.

At block 222, a dig operation may be identified by observing a position of the bucket 12 and at least a lift arm position, using, for example, lift cylinder position sensor 20. The dig operation may result in the bucket 12 taking on a load of material.

At block 224, sensors may be used to identify that the bucket 12 is fully racked, indicating that the dig operation is complete. Fully racking the bucket 12 may provide weight and balance information to the payload controller that may be used to either calculate or estimate the weight of the payload in the bucket 12.

At block 226, a partial dump of the bucket 12 may be identified. Pressure sensors associated with the lift cylinder 19 and bucket tilt cylinder 18 may provide information used to determine that the bucket 12 was not fully dumped, both by position and by weight. At the completion of this cycle, at block 228, tip-off mode may be determined and tip-off mode may be set to active.

Figure 7:
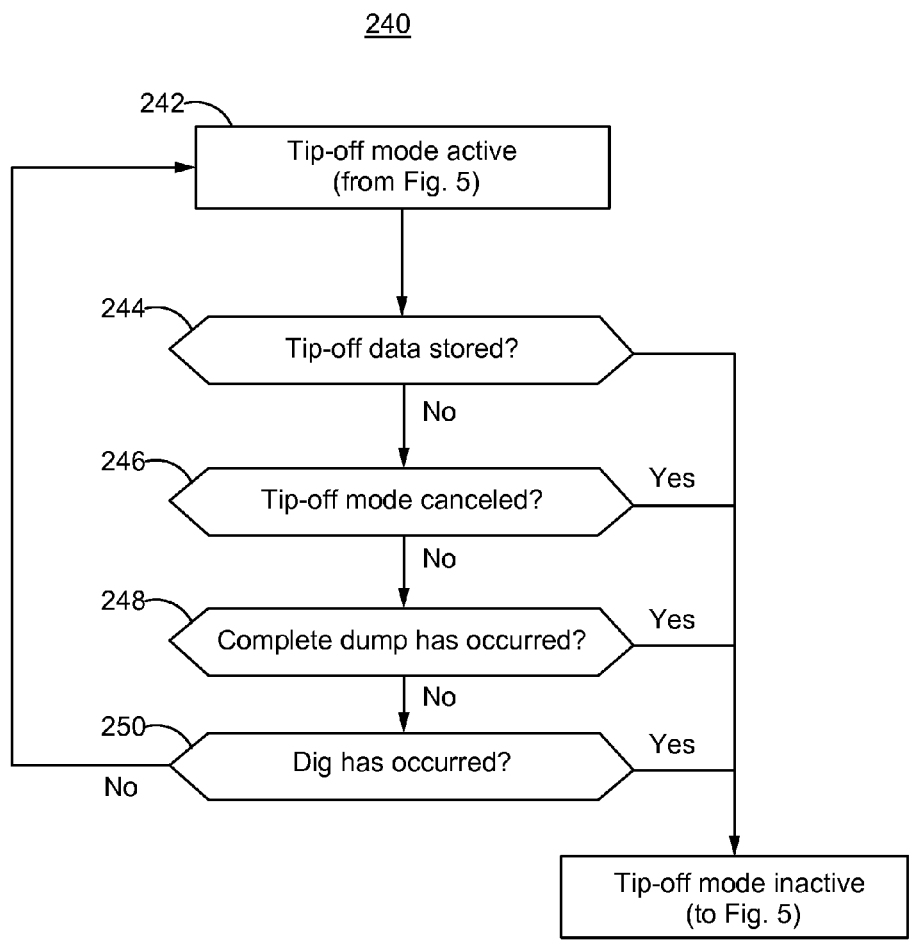
FIG. 7 is a flowchart of a method of determining tip-off mode completion.

FIG. 7 is a method 240 of determining completion of a tip-off mode of operation in a loader and may be used at block 214 of FIG. 5. Beginning at block 242 with tip-off mode active, a series of conditions may be checked, any of which may indicate completion of the tip-off mode.

At block 244, the operator may manually cause tip-off data to be stored via a user interface, such as a touch screen input on the display 108, signifying an end to tip-off mode and causing execution to follow the 'yes' branch to block 252 where the tip-off mode is set to inactive.

If the operator has not manually stored tip-off data, execution may continue at block 246.

At block 246, the operator may manually cancel the tip-off mode also causing execution to follow the 'yes' branch to block 252. If the operator has not canceled the tip-off mode, execution may continue at block 248.

At block 248, input from sensors may be used to determine if a complete dump has occurred. In one embodiment, the split mode may have been used to split a bucket payload across two trucks. In another embodiment, the bucket 12 may simply have been dumped. Following a complete dump, execution may follow the 'yes' branch and execution continued at block 252. If a complete dump has not occurred, execution may continue at block 250.

At block 250, a determination of a dig may made, as described above, using bucket position and cylinder pressure sensors. A dig will cause partial payload information to be lost, so that effectively cancels the tip-off information available and therefore puts an end to the current tip-off mode operation by following the 'yes' branch to block 252.

If a dig has not occurred, execution may follow the 'no' branch to block 242 and the loop may be traversed again to determine completion of the tip-off mode. Other specific methods may be used to determine the end of tip-off mode, such as using interrupts to signal active states rather than the loop described above or any number of other techniques for determining a condition, such as polling.

In an embodiment, various code modules may be used to implement the dynamic tip-off functionality. Referring again to FIG. 2, a first code module 120 may receive input from an operator, such as operating instructions and, more particularly, to set a tip-off location. A second code module 121 may receive information from the plurality of sensors and determine a tip-off operation and sets a tip-off mode to active as discussed above with respect to FIG. 6.

A third code module 122 may cause the display to show that a tip-off mode is active and a current tip-off location. For example, a screen icon may be highlighted as discussed above with respect to FIG. 4B and FIG. 4C. A fourth code module 123 may store tip-off payload information until an indication that the tip-off mode has ended, causing the third code module 122 to store the tip-off payload weights in the current tip-off location. In this state, the fourth code module may also cause the second code module 121 to a change the display to show that tip-mode is inactive. A fifth code module 124 may receive an indication of a tip-off location change that causes the third code module to store the tip-off payload in a new tip-off location. The fifth code module 124 may be active even after the tip-off mode is inactive, for example, until a new dig is detected, allowing an operator to change the tip-off mode after the load dump and potentially avoid misrepresenting actual truck loading or causing a truck to dump its contents and start over.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A method of enhancing tip-off operation in a loader, the method comprising:
   receiving at least one input from one or more sensors in the loader;
   using at least one input, automatically detecting a tip-off;
   setting a tip-off mode to active;
   setting an operator display to indicate that the tip-off mode is active;
   setting the operator display to indicate a tip-off location;
   determining that the tip-off is complete;
   setting the tip-off mode to inactive; and
   setting the operator display to indicate that the tip-off mode is inactive.

2. The method of claim 1, further comprising accepting an input to change the tip-off location.

3. The method of claim 1, wherein automatically detecting the tip-off comprises:
   identifying a dig operation using at least a lift arm position sensor;

identifying a fully racked position of a bucket using at least a bucket tilt position sensor; and identifying a partial dump of the bucket.

4. The method of claim 1, wherein setting the tip-off mode to active comprises setting a memory location in an electronics control module that indicates tip-off functions are to be performed.

5. The method of claim 1, wherein determining that the tip-off is complete comprises:

receiving a selection to store tip-off data.

6. The method of claim 1, wherein determining that the tip-off is complete comprises:

receiving an input canceling the tip-off mode.

7. The method of claim 1, wherein determining that the tip-off is complete comprises:

determining that a complete dump of a bucket has occurred.

8. The method of claim 1, wherein determining that the tip-off is complete comprises:

determining that a dig has occurred.

9. The method of claim 1, wherein setting the operator display to indicate that the tip-off mode is active comprises highlighting an icon on a display in the loader.

10. The method of claim 1, wherein setting the operator display to indicate the tip-off location comprises highlighting one of a first icon indicating a truck tip-off and a second icon indicating a pile tip-off on a display in the loader.

11. A system for enabling hands-free tip-off operation in a loader with a bucket, the system comprising:

a display configured to display icons related to a truck payload, a bucket payload, a current tip-off location, and a tip-off mode;

an input that receives operating instructions;

a plurality of sensors that report a position of the bucket and a mass of material in the bucket;

an electronics control module having a processor, a memory, and code modules stored in the memory that are executed on the processor, the code modules including:

a first code module that receives the operating instructions and sets a current tip-off location;

a second code module that receives information from the plurality of sensors and determines the current tip-off operation and sets the tip-off mode to active;

a third code module that causes the display to show that the tip-off mode is active and the current tip-off location; and a fourth code module that stores tip-off payload information until an indication that the tip-off mode has ended, causing the third code module to store the tip-off payload according to the current tip-off location and further causing the second code module to a change the display to show that tip-mode is inactive.

12. The system of claim 11, wherein the input is a touch-screen component of the display.

13. The system of claim 11, further comprising a fifth code module that receives a signal indicating a tip-off location change that causes the third code module to store the tip-off payload in a new tip-off location.

14. The system of claim 13, wherein the tip-off payload is one of a first amount dumped when the tip-off location is truck and a second amount retained when the tip-off location is pile.

15. A method of reducing human-computer interaction in a loader during tip-off operation, the method comprising:

without human input, automatically detecting a tip-off operation;

displaying an indication of operation in a tip-off mode;

displaying an indication of a tip-off location;

storing payload data according to the tip-off mode and the tip-off location;

detecting completion of the tip-off operation; and clearing the displaying of the indication of operation in the tip-off mode.

16. The method of claim 15, further comprising:

receiving a selection of tip-off location; and updating a calculation for storing payload data according to the selection of tip-off location.

17. The method of claim 15, wherein automatically detecting the tip-off operation comprises:

identifying a dig operation using at least a lift arm position sensor;

identifying a fully racked position of a bucket using at least a bucket tilt position sensor; and identifying a partial dump of the bucket.

18. The method of claim 15, wherein displaying the indication of operation in the tip-off mode comprises highlighting one of a first icon indicating a truck tip-off and a second icon indicating a pile tip-off on a display in the loader.

19. The method of claim 15, wherein detecting completion of the tip-off operation comprises one of receiving a selection to store tip-off data and receiving an input canceling the tip-off mode.

20. The method of claim 15, wherein detecting completion of the tip-off operation comprises one of determining that a complete dump of a bucket has occurred and determining that a dig has occurred.

* * * * *

UNITED STATES PATENT AND TRADEMARK OFFICE
CERTIFICATE OF CORRECTION

| | |
|---|---|
| PATENT NO. | : 8,954,243 B2 |
| APPLICATION NO. | : 13/890340 |
| DATED | : February 10, 2015 |
| INVENTOR(S) | : Harshberger, II et al. |

It is certified that error appears in the above-identified patent and that said Letters Patent is hereby corrected as shown below:

Title Page, Column 1, Item 72 (Inventors), line 1, delete "Wayne E. Harshberger," and insert -- Wayne E. Harshberger II, --.

In the specification

Column 4, line 32 (Approx.), delete "Industrial Applicability" and insert -- INDUSTRIAL APPLICABILITY --.

Signed and Sealed this
Twenty-ninth Day of December, 2015

Michelle K. Lee
*Director of the United States Patent and Trademark Office*